United States Patent
Ghia

(10) Patent No.: US 10,343,236 B2
(45) Date of Patent: Jul. 9, 2019

(54) SYSTEM AND METHOD FOR VARIABLE PERFORATION PROFILES IN A STACK OF LOTTERY TICKETS BASED ON FOLD PATTERN

(71) Applicant: Scientific Games International, Inc., Newark, DE (US)

(72) Inventor: Ajay J. Ghia, Cumming, GA (US)

(73) Assignee: Scientific Games International, Inc., Newark, DE (US)

( * ) Notice: Subject to any disclaimer, the term of this patent is extended or adjusted under 35 U.S.C. 154(b) by 249 days.

(21) Appl. No.: 15/188,421

(22) Filed: Jun. 21, 2016

(65) Prior Publication Data

US 2017/0361397 A1    Dec. 21, 2017

(51) Int. Cl.
| | |
|---|---|
| *A63F 3/06* | (2006.01) |
| *B23K 26/00* | (2014.01) |
| *B23K 26/08* | (2014.01) |
| *B23K 26/082* | (2014.01) |
| *G05B 17/02* | (2006.01) |
| *B23K 26/359* | (2014.01) |

(Continued)

(52) U.S. Cl.
CPC .......... *B23K 26/359* (2015.10); *A63F 3/0605* (2013.01); *A63F 3/0665* (2013.01); *B23K 26/0006* (2013.01); *B23K 26/0622* (2015.10); *B23K 26/0821* (2015.10); *B23K 26/0846* (2013.01); *G05B 17/02* (2013.01); *G05B 19/402* (2013.01); *B23K 2101/16* (2018.08); *B23K 2103/40* (2018.08); *G05B 2219/45041* (2013.01)

(58) Field of Classification Search
CPC ..... A63F 3/065; A63F 3/0665; B23K 26/359; B23K 26/364; B41M 3/005; B65H 45/101; B65H 45/1015; B65H 45/228; B65H 2301/5152; B65H 2301/51536; G05B 19/18; G07B 5/02; G07C 15/005
USPC ........................................................ 700/122
See application file for complete search history.

(56) References Cited

U.S. PATENT DOCUMENTS 2,664,815 A    1/1954  Schuessler
4,218,606 A *  8/1980  Whitman, III ....... B23K 26/048
                                             219/121.6

(Continued)

FOREIGN PATENT DOCUMENTS

CA    1290454 C  * 10/1991  ............. G06Q 50/34
EP    0443646 A1 *  8/1991  ......... B23K 26/0846

*Primary Examiner* — Michael Fin
(74) *Attorney, Agent, or Firm* — Dority & Manning, P.A.

(57) ABSTRACT

A method and associated system are provided for producing a perforation line between adjacent lottery tickets in an automated production line wherein a substrate having lottery tickets printed thereon is conveyed through a perforation station in the production line prior to being folded into a Z-fold pattern for subsequent packaging. A perforation machine in the line is controlled by a controller for defining the perforation lines, wherein the control process includes determining the perforation lines that correspond to fold lines in the Z-fold pattern and, for these perforation lines, programming the perforation machine to generate a second perforation profile that is different from a first perforation profile of non-fold perforation lines that lie between the fold lines in the Z-fold pattern. The second perforation profile is specifically tailored to produce a stronger perforation line to compensate for weakness induced in the perforation line from being folded.

10 Claims, 5 Drawing Sheets

(51) Int. Cl.
    *G05B 19/402*     (2006.01)
    *B23K 26/0622*     (2014.01)
    *B23K 101/16*     (2006.01)
    *B23K 103/00*     (2006.01)

(56) References Cited

U.S. PATENT DOCUMENTS

| | | | | |
|---|---|---|---|---|
| 4,297,559 | A * | 10/1981 | Whitman, III | B23K 26/03 |
| | | | | 219/121.62 |
| 4,568,815 | A * | 2/1986 | Kimbara | B23K 26/0846 |
| | | | | 219/121.6 |
| 4,858,123 | A * | 8/1989 | Alexoff | A63F 3/065 |
| | | | | 101/484 |
| 5,064,179 | A * | 11/1991 | Martin | B65H 35/10 |
| | | | | 225/100 |
| 5,557,311 | A * | 9/1996 | Perrington | B42C 3/00 |
| | | | | 283/103 |
| 5,882,572 | A * | 3/1999 | Lutze | B23K 26/009 |
| | | | | 219/121.71 |
| 6,046,427 | A * | 4/2000 | Richter | B23K 26/0643 |
| | | | | 219/121.67 |
| 6,431,437 | B1 * | 8/2002 | Lombardo | B42D 15/08 |
| | | | | 229/305 |
| 6,565,500 | B1 * | 5/2003 | Hailey | B65H 18/00 |
| | | | | 270/39.06 |
| 6,584,899 | B1 * | 7/2003 | Buschulte | B26D 11/00 |
| | | | | 101/226 |
| 6,594,026 | B2 | 7/2003 | MacDonald | |
| 6,599,228 | B2 * | 7/2003 | Hailey | B65H 18/00 |
| | | | | 493/405 |
| 6,626,096 | B1 | 9/2003 | Shoemaker, Jr. | |
| 7,219,828 | B2 * | 5/2007 | Lombardo | B42D 15/08 |
| | | | | 229/70 |
| 8,071,912 | B2 * | 12/2011 | Costin, Sr. | B44C 1/005 |
| | | | | 219/121.85 |
| 8,505,897 | B2 * | 8/2013 | McIntyre | B42C 19/06 |
| | | | | 270/37 |
| 8,505,898 | B2 * | 8/2013 | McIntyre | B42C 19/06 |
| | | | | 270/37 |
| 8,763,526 | B2 | 7/2014 | McNeil et al. | |
| 9,050,686 | B2 * | 6/2015 | Costin, Sr. | B23K 26/0846 |
| 9,168,767 | B2 * | 10/2015 | Scrymgeour | B41J 3/4075 |
| 9,533,854 | B2 * | 1/2017 | Beier | B65H 45/28 |
| 9,656,156 | B2 * | 5/2017 | Gratton | A63F 3/0695 |
| 9,849,711 | B2 * | 12/2017 | Schaede | B42D 15/00 |
| 2015/0042041 | A1 * | 2/2015 | Bedford | A63F 3/0665 |
| | | | | 273/139 |
| 2016/0346675 | A1 * | 12/2016 | Gratton | A63F 3/0695 |

\* cited by examiner

SYSTEM AND METHOD FOR VARIABLE PERFORATION PROFILES IN A STACK OF LOTTERY TICKETS BASED ON FOLD PATTERN

BACKGROUND

Instant scratch-off lottery tickets are generally supplied to retail vending locations in the form of individual rolls or folded packs (also referred to as "packs" or "books") of interconnected tickets, wherein perforation lines separate the ends of adjacent tickets. The common edge between adjacent tickets extends perpendicular to the top side and bottom side of each ticket. The tickets include any manner of indicia and graphics, as well as a play area wherein one or more game symbols are covered with a scratch-off coating. For dispensing, the lead ticket is torn from the pack or roll along the perforation line. The packs or rolls may be loaded into a dispenser wherein the leading ticket is pulled through a dispensing slot prior to being separated.

The scratch-off lottery tickets are typically mass produced in a high-speed production line that includes a perforating machine that defines the perforation line between adjacent tickets. With the conventional machinery and methods, however, the perforation line profile is defined by the mechanical cutter profile and cannot vary unless the manufacturing line is stopped and the cutter is exchanged for another that produces a different perforation profile. Even between different ticket production runs, it is a relatively complicated and time consuming procedure to change out the mechanical cutter or blades at the perforation station, which may be necessary when a change is made in the paper stock to be processed into the lottery tickets. Thus, the inability to quickly and reliably change perforation profiles either between production runs or mid-stream of a production run is a particular disadvantage with conventional systems and methods.

The present invention provides a solution to the problem noted above, as well as adding additional functionalities to the perforation process in lottery ticket production lines.

SUMMARY

Objects and advantages of the invention will be set forth in part in the following description, or may be obvious from the description, or may be learned through practice of the invention.

In accordance with aspects of the invention, a method is provided for producing a perforation line between adjacent lottery tickets in an automated production line. In a particular embodiment, the lottery tickets are instant scratch-off tickets. The method includes conveying a substrate, such as a paper stock, through a perforation station in the production line, wherein the substrate has individual lottery ticket indicia printed thereon such that a continuous stream of adjacent lottery tickets oriented end-to-end are conveyed through the perforation station. The substrate may have a plurality of rows of such tickets, wherein the rows are subsequently separated in a downstream slitter station prior to being folded in a Z-fold pattern and packaged as ticket packs or bricks. A perforation machine at the perforation station is controlled by a controller to define a perforation line between the ends of adjacent lottery tickets.

In the well-known Z-fold pattern, the tickets are fan-folded in a back-and-forth manner at certain perforation lines (referred to herein as "fold line perforation lines"). In certain ticket configurations, the tickets have a length that is less than the length of the folded stack such that one or more perforation lines lay between the fold line perforation lines. For example, the folded stack of tickets may have a length of eight-inches, wherein each individual ticket has a length of 4-inches. In this configuration, there are two lottery tickets within each layer of the folded stack and one non-fold perforation line between the folded lines. In another embodiment of an eight-inch long folded stack, each ticket may be two-inches long, wherein there are three non-fold perforation lines between the folded perforation lines.

The present inventive system and method recognize that a weakness is inherently introduced to the folded perforation lines in the Z-fold pattern, thus rendering these perforation lines more susceptible to premature tearing or failure during the subsequent dispensing operation. The present method and system compensates for this inherent weakness.

In this regard, the control process includes determining the perforation lines that correspond to fold lines in the Z-fold pattern for a particular ticket configuration. For example, every other perforation line may correspond to a fold line, or every fourth perforation line may correspond to a fold line, as discussed above with respect to two-inch and four-inch tickets. For the perforation lines determined to correspond to fold lines, the controller programs the perforation machine to generate a second perforation profile that is different from a first perforation profile assigned to the non-fold perforation lines that lie between the fold lines in the Z-fold pattern. This second perforation profile is specifically tailored to produce a stronger perforation line to compensate for weakness induced in the perforation line from being folded.

In a particular embodiment, the second perforation profile is generated so that a relatively same tear force is needed to separate the lottery tickets at the fold line perforation lines as compared to non-fold perforation lines. This "relatively" same tear force may be quantitatively determined so that the two tear forces are within a defined percentage of each other (e.g., 5%), or may be determined simply by feel or perception of a person performing the dispensing operation.

In certain embodiments, different second perforation profiles are pre-generated and stored in an electronic library that is accessible by the controller, wherein the different second perforation profiles correspond to different types of substrate characteristics. For example, the second perforation profile for a substrate having a greater thickness or density may be different from a substrate having a thinner or less dense makeup. In this embodiment, the type or other characteristics of the substrate may also be input to the controller.

In a desirable embodiment, the perforation machine is a laser perforation machine having one or more laser perforation heads that are controlled by the controller for producing the different perforation profiles.

The invention also encompasses a system for implementing the methods described above. For example, a system is provided for producing a perforation line between adjacent lottery tickets in an automated production line wherein a substrate is conveyed through a perforation station in the production line, the substrate having individual lottery ticket indicia printed thereon such that a continuous stream of adjacent lottery tickets oriented end-to-end are conveyed through the perforation station prior to being folded into a Z-fold pattern for subsequent packaging. The system includes a perforation machine at the perforation station that defines a perforation line between the adjacent lottery tickets. A controller is in communication with the perforation machine and is configured to receive an input determining the perforation lines that correspond to fold lines in the Z-fold pattern. For these particular perforation lines, the controller programs the perforation machine to generate a second perforation profile that is different from a first perforation profile of non-fold perforation lines that lay between the fold lines in the Z-fold pattern. In this manner, the second perforation profile is specifically tailored to produce a stronger perforation line to compensate for weakness induced in the perforation line from being folded.

In a desirable embodiment of the system, the perforation machine is a laser perforation machine having one or more laser perforation heads that are controlled by the controller for producing the different perforation profiles.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

DETAILED DESCRIPTION

Figure 1:
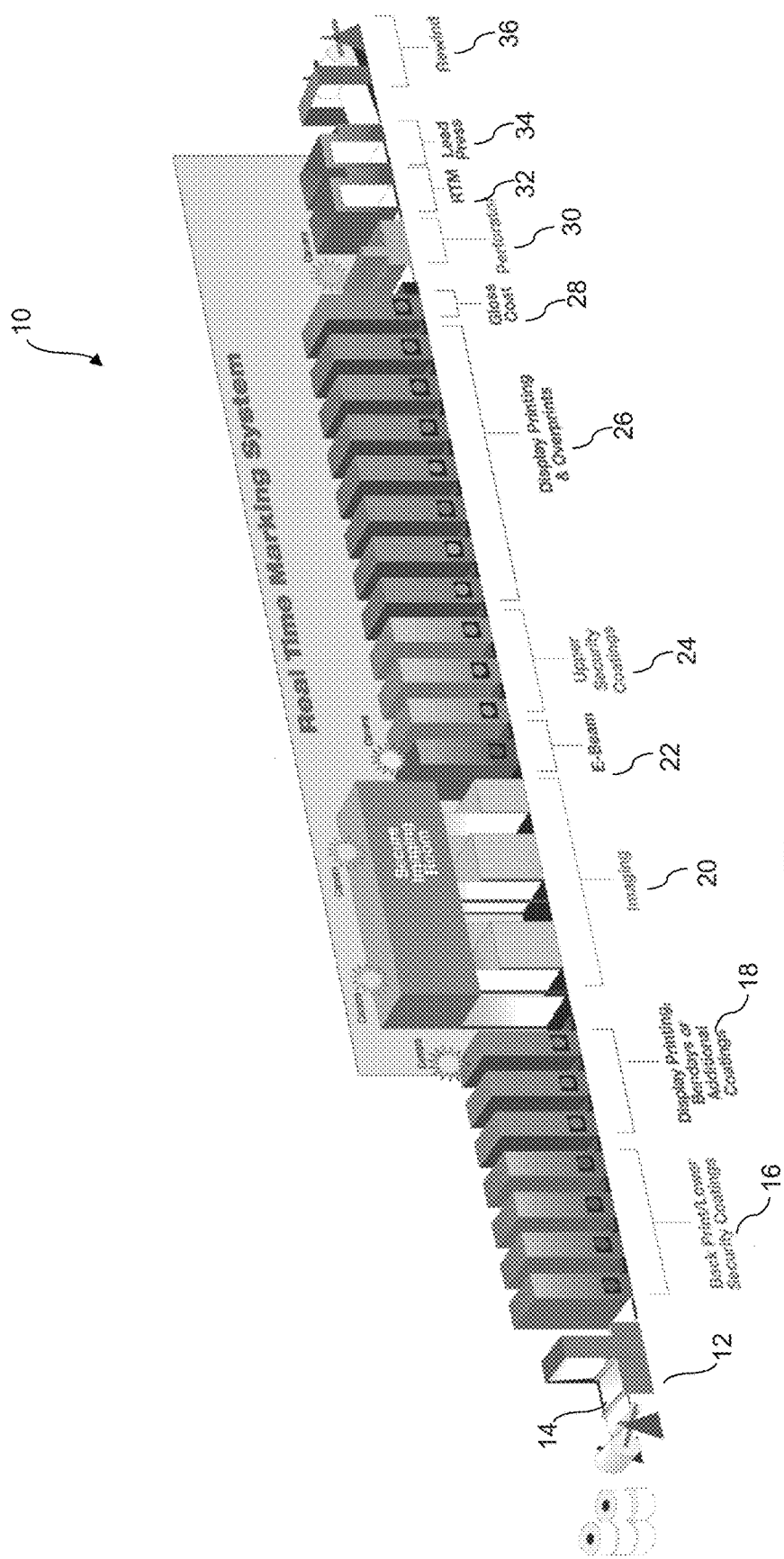
FIG. 1 is an operational diagram of a lottery ticket production line that incorporates a perforation station in accordance with the present invention.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

As mentioned, the present invention relates to method and system embodiments for producing a perforation line between adjacent lottery tickets in an automated production line. In a particular embodiment, the lottery tickets are instant scratch-off tickets. The present invention appreciates that, when the interconnected lottery tickets are eventually folded into a Z-fold pattern, an inherent weakness is introduced into the perforation lines corresponding to the fold lines. The invention provides a means and a system to compensate for this weakness, thereby reducing the risk of premature failure of the fold line perforation lines.

It is understood that the perforation profile is the pattern and/or size of the holes or slits defined through the substrate along the perforation line. The greater the number or size of the holes or slits, the lesser amount of intact substrate remains, resulting in a weaker perforation line. Thus, the perforation profile dictates the amount of "tear" force necessary to separate a leading ticket from the remainder of the pack or roll, or in other words, the strength of the perforation line. The perforation line needs to have adequate strength to ensure that the tickets remain attached under all anticipated conditions. Perforation line failures wherein tickets prematurely separate within a Z-folded pack result in numerous undesirable events. For example, if the pack is loaded into a dispenser, the dispenser bin must be unlocked to retrieve and thread the disconnected ticket through the dispensing slot. Loading of new packs into a dispenser wherein the tickets have separated at one or more of the folded perforation lines results in multiple mini-packs that must be loaded in a particular order to ensure sequential serial number dispensing. These mini-packs are usually taped together at the failed perforation lines. Consumers are wary of a "new" ticket that has been taped to another ticket, and often refuse to purchase the questionable ticket. Separation of the tickets also brings into question accountability issues.

Likewise, an acceptable tear force at a Z-fold perforation may result in an unacceptably high tear force at an unfolded perforation. This can cause the line of separation to become uneven, not following the perforation line, upon being dispensed. This is also unacceptable, and may cause a failure of the dispenser.

With the present system and method embodiments, the profile for the perforation lines corresponding to the fold lines in the ticket pack is different from the perforation profile of the non-fold perforation lines. Specifically, the fold line perforation lines are defined to be stronger to compensate for any weakness induced in the fold lines from being folded.

The profile of the folded perforation lines may further depend on a variable characteristic of the ticket substrate, such as the composition, thickness, or density of the substrate material. For a given perforation profile, a thicker substrate requires a greater tear strength to separate the tickets along the perforation profile. Likewise, for certain stock materials, the synthetic fiber material versus pulp fiber material content of the substrate will affect the required tear strength. Certain pulp fibers produce a stronger paper stock as compared to other types of pulp fibers. In certain embodiments, these variables are considered and accounted for in generation of the folded perforation line profiles.

In accordance with aspects of the present system and method embodiments, the fold line perforation lines are determined and the perforation profiles for these lines is modified or changed to compensate for weakness induced in the perforation lines from being folded, as discussed below.

FIG. 1 depicts an exemplary production line 10 for manufacturing instant scratch-off lottery tickets that may be configured with aspects of the present invention. This particular production line 10 is presented for illustrative purposes only and to place the invention in an exemplary operating environment. It should be appreciated that the present methods and systems are not limited to any particular production line configuration.

Still referring to FIG. 1, a substrate 14 on which the lottery tickets are to be printed is delivered to an unwind station, typically in the form of rolls, with the unwind station including a suitable web tensioning device. The substrate is then conveyed to a first printing station 16 that includes multiple printing machines for applying one or more security lower security layers (e.g. a black layer) to the substrate.

The substrate 14 is then conveyed to second printing station 18 that includes multiple printing machines for applying any desired manner of display images, confusion patters (e.g. Benday patterns), or additional coatings over the security layers for each lottery ticket.

The substrate 14 is then conveyed to a secure imaging station 20, which may include a plurality of printing/imaging machines in a highly secure room, wherein the game data indicia is printed on each of the tickets and a scratch-off layer of material is applied over the game data indicia. The tickets are conveyed from the secure imaging room through an "E-Beam" clear coating station 22 wherein a coating is applied and cured to protect the game play data. The variable data printed on the tickets is synchronized with the downstream perforation process so that the Z-fold perforation profile is used to begin each pack or brick of tickets.

The substrate 14 is then conveyed through a security coatings station 24 wherein a plurality of printing machines apply one or more securing coatings over the scratch-off layer.

The substrate 14 is then conveyed through an additional printing station 26 wherein any manner of graphics are printed over the scratch-off layer and/or non-game play areas of each ticket.

The substrate 14 is then conveyed through a gloss coat application machine 30.

From the gloss coat station 28, the substrate 14 is conveyed through a perforation station 30 configured in accordance with the invention (and described in greater detail below). At this station, perforation lines are defined in the substrate transverse to the longitudinal travelling direction of the substrate 14. As is well understood, the perforation line defines a separation line between adjacent ends of interconnected tickets.

The perforated substrate 14 is then conveyed through an RTM ("Real Time Marking") station 32 where press personnel watch/inspect the web substrate while printing for quality control issues.

The substrate 14 is then conveyed through a "Lead Press" station 34, which includes the main press console. This is the station where a "lead press operator" essentially controls the entire press operation.

Finally, the substrate 14 is brought to a rewind station 36 wherein the perforated substrate 14 with multiple rows of lottery tickets printed thereon is wound back into a roll package.

From the rewind station, the ticket rolls are eventually transported to additional processing stations wherein the substrate 14 is unwound and conveyed through a slitter for separating the individual rows of interconnected and perforated tickets. The individual rows of tickets are then conveyed through a folding station wherein the tickets are folded in a Z-pattern into individual packs prior to being wrapped and sealed.

Figure 2:
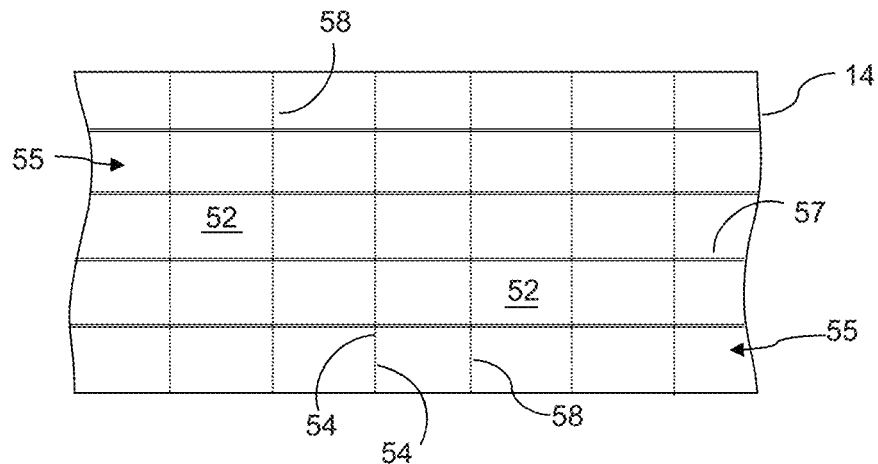
FIG. 2 is a diagram of a substrate having multiple rows of lottery tickets and perforation lines across the substrate that separate the adjacent ends of the lottery tickets.

FIG. 2 depicts a partial section of the web 14 after passing through the perforation station 30. A plurality of rows 55 of individual lottery tickets 52 are printed on the substrate 14. The ticket rows 55 have common sides 57 that are delineated by any manner of graphics, alignment marks, etc. The rows 55 are eventually separated at the sides 57 by the downstream slitter. The individual tickets 52 within each row have adjacent ends 54 defined by the perforation lines 58.

Figure 3:
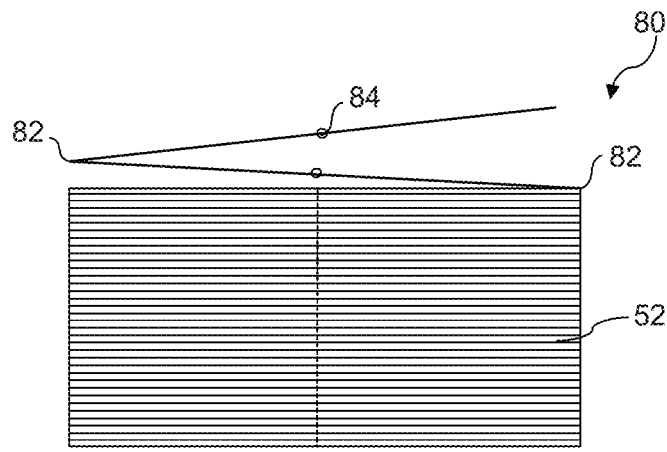
FIG. 3 is a side view of a stack of lottery tickets folded into a Z-fold pattern.

FIG. 3 depicts the individual rows of tickets 52 folded into a well-known Z-fold stack 80. The tickets 52 are mechanically folded at a fold station in a back-and-forth manner along certain of the perforation lines designated herein as fold line perforations 82. Depending on the length of the stack 80 and the length of the individual tickets, one or more non-fold perforation lines 84 are between the opposite fold line perforations 82, as discussed above. For example, referring to FIG. 4, the folded stack 80 of tickets 52 may have a length of eight-inches, wherein each individual ticket 52 has a length of 4-inches. In this configuration, there are two lottery tickets 52 within each layer of the folded stack 80 and one non-fold perforation line 84 between the folded perforation lines 82.

Figure 5:
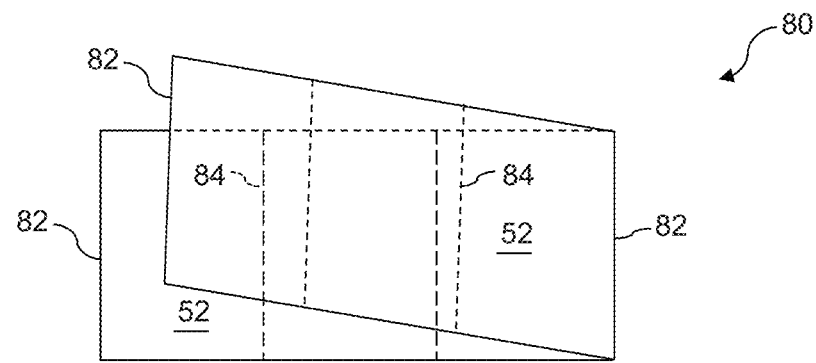
FIG. 5 is a top perspective view of Z-folded lottery tickets with two non-fold perforation lines between the opposite fold line perforation lines.

In another embodiment depicted for example in FIG. 5, the folded stack 80 may have a nine-inch length, wherein each of three tickets 52 within a single layer is three-inches long, and wherein there are two non-fold perforation lines 84 between the opposite folded perforation lines 82.

Figure 4:
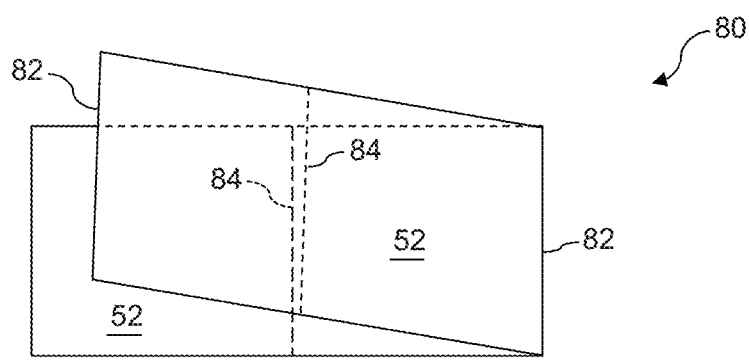
FIG. 4 is top perspective view of Z-folded lottery tickets with one non-fold perforation line between the opposite fold line perforation lines.
Figure 6:
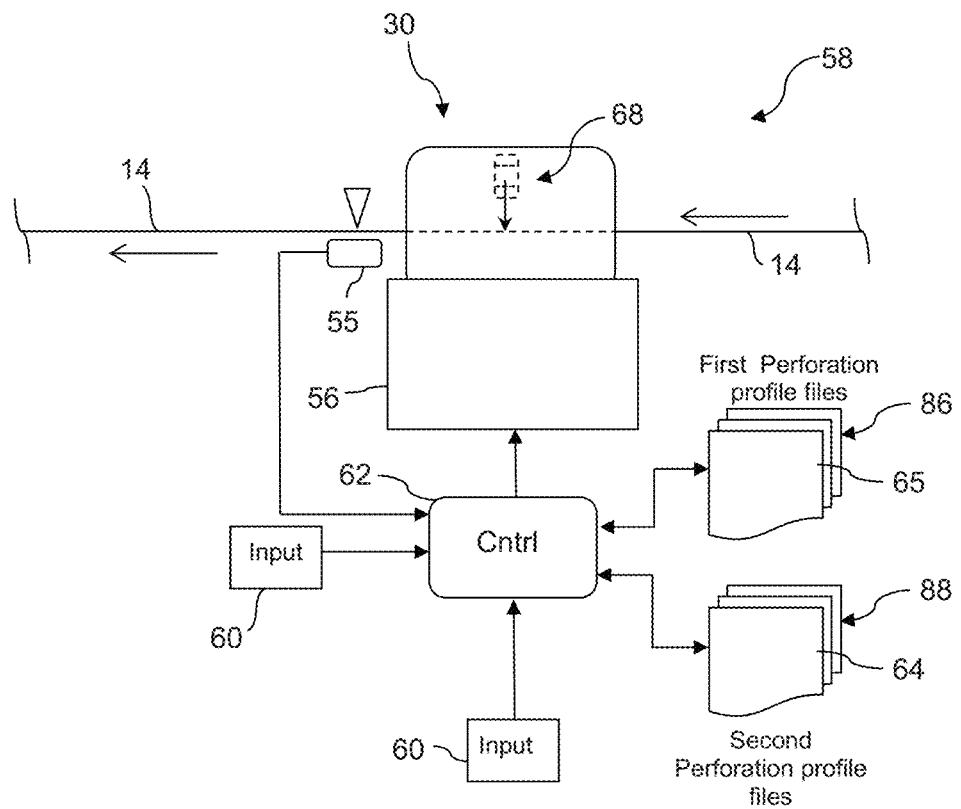
FIG. 6 is a block diagram of a perforation system in accordance with aspects of the invention.

FIG. 6 depicts a system and method 50 in accordance with the invention implemented at the perforation station 30. The substrate 14 is conveyed through the perforation station 30 in the production line, wherein the substrate 14 has individual lottery ticket indicia printed thereon such that a continuous stream of adjacent lottery tickets 52 (FIG. 2) oriented end-to-end are conveyed through the perforation station 30. A perforation machine 56 at the perforation station 30 is controlled by controller 62 to define a perforation line 58 (FIG. 2) between the adjacent lottery tickets. This control process includes determining the perforation lines that correspond to fold lines 82 in the Z-fold pattern for a particular ticket configuration. For example, as depicted in the embodiment of FIG. 4, every other perforation line may correspond to a fold line 82. This variable is an input 60 to the controller 62 that controls operation of the perforation machine 56. For the perforation lines 82 determined to correspond to fold lines, the controller programs the perforation machine to generate a second perforation profile 64 (FIG. 9) that is different from a first perforation profile 65 (FIG. 8) assigned to the non-fold perforation lines 84 that lie between the fold line perforations 82 in the Z-fold stack 80. This second perforation profile 64 is specifically tailored to produce a stronger perforation line to compensate for weakness induced in the perforation line from being folded.

In a particular embodiment, the second perforation profile 64 is generated so that a relatively same tear force is needed to separate the lottery tickets 52 at the fold line perforation lines 82 as compared to non-fold perforation lines 84. This "relatively" same tear force may be quantitatively determined so that the two tear forces are within 5% of each other, or may be determined simply by feel or perception of a person performing the dispensing operation.

Referring to FIG. 6, in certain embodiments, a plurality of different second perforation profiles 64 are pre-generated and stored in an electronic library 88 that is accessible by the controller 62. These different second perforation profiles 64 may correspond to different types of substrate characteristics. For example, the second perforation profile 64 for a substrate having a greater thickness or density may be different from a substrate having a thinner or less dense makeup. In this embodiment, the type or other characteristics of the substrate may also be input to the controller 62 as an additional input 60.

The controller 62 may also be in communication with a library 86 of different first perforation profiles 65, which may also be based on characteristics of different types of substrates 14.

Figure 7:
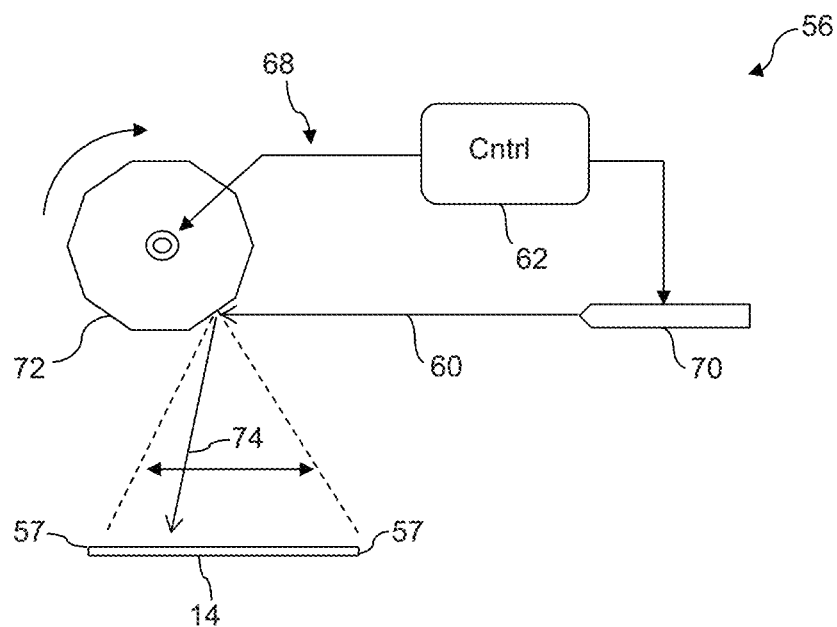
FIG. 7 is a block diagram of an embodiment of a laser perforation system.

In a particular embodiment, the perforation machine 56 is a computer-controlled laser perforation machine 68, as depicted in FIGS. 6 and 7. Commercial laser perforators are available, and it is contemplated that a number of these readily available machines 68 may be modified and configured to operate in a lottery ticket production line in accordance with aspects of the invention discussed herein. For example, FIG. 7 depicts a laser perforation 68 having one or more laser generators 70. In order to generate and direct a pulsed laser beam 74 in a transverse direction across the substrate 14 as the substrate moves continuously in the longitudinal traveling direction, a relatively high speed rotary mirror 72 may be utilized to direct the beam 74 in a back-and-forth traversing path between the edges 57 of the substrate, as depicted by the double-arrow line in FIG. 7.

A laser perforation machine 68 has distinct advantages. For example, with a mechanical cutter, the perforation blades produce a varying perforation characteristic as the blades dull with use. The laser does not dull. Also, mechanical (blade) perforation characteristics are non-uniform depending on which side of the web the puncture begins, as fibers are compressed downward as the blade penetrates the paper. A laser provides more symmetric characteristics as the web is severed cleanly and uniformly from top to bottom without compression of the fibers.

As depicted in FIG. 6, it may be desired to include real-time feedback to the laser machine 68 that is used to vary laser intensity. For example, a sensor 55 may be utilized to detect light transmitted through the perforation line, wherein the amount of light detected is an indication of perforation characteristics. Such feedback can be used to vary the laser intensity to achieve an even greater uniformity of the perforation line.

Figure 8:
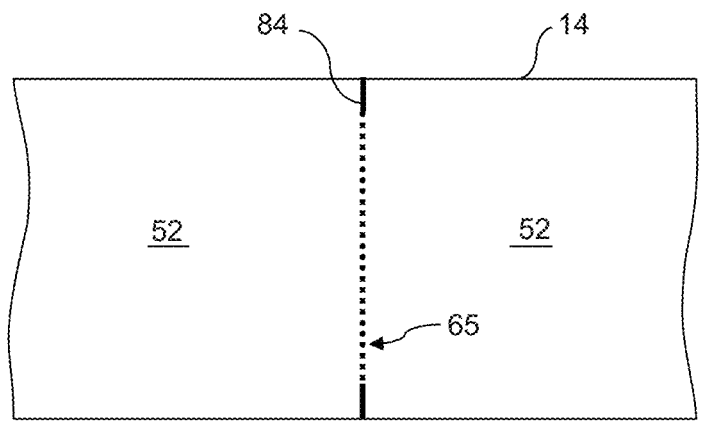
FIG. 8 is a top view of interconnected lottery tickets having a first type of perforation profile.
Figure 9:
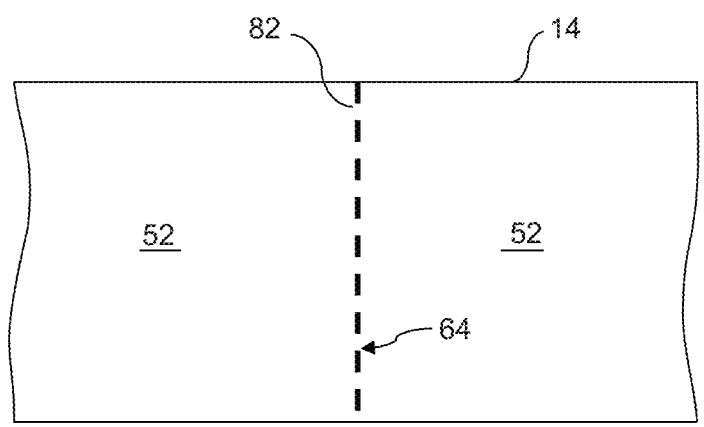
FIG. 9 is a top view of interconnected lottery tickets having a second type of perforation profile.

FIGS. 8 and 9 are provided to illustrate the concept of the different perforation profiles 64 and 65, as discussed above. The differences between the profiles 64 and 65 result from the duration and intensity of the pulsed laser 74. The longer the "on" time of the laser 74 and/or the intensity (power) of the laser, the longer or wider are the holes defined through the substrate 14 (indicated by the dark portions of the perforation lines 84, 82 in FIGS. 8 and 9). Likewise, the longer the "off" time of the pulsed laser 74, the greater is the amount of substrate that remains intact between the holes. Thus, the operation of the laser generator 70 is controlled in accordance with one of the perforation profiles 64 and 65 to achieve separately tailored perforation lines for the folded line perforations 82 and the non-fold perforation lines 84.

It can be appreciated from FIG. 8 that the perforation profiles need not be uniform across the entire perforation line for either of the types of perforation lines 82, 84. The present system and method provide the unique benefit to tailor discrete specific sections or portions of the perforation lines 82, 84. For example, as depicted in FIG. 8, it may be desired to provide the extreme ends of the perforation line 84 with an initial elongated tear or separated portion in order to ensure that subsequent tears to separate the tickets 52 propagate along the perforation line 84 and require a reduced initial tear force.

Aspects of the present method and system refer to a "controller", as discussed above. The term "controller" is used herein to encompass any configuration of computer hardware and software that is maintained to carry out the functionalities of the present system and associated method, as well as any manner of additional lottery functions known to those skilled in the art. It should be readily appreciated that the controller 62 may include an integrated server, or any manner of periphery server or other hardware structure.

The controller 62 may include a memory for storing operating procedures and routines related to the perforation machine, a memory for the library 66 of stored perforation profiles 64, a microprocessor (MP) for executing the stored programs 64, a random access memory (RAM) and an input/output (I/O) bus. These devices may be multiplexed together via a common bus, or may each be directly connected via dedicated communications lines, depending on the needs of the system 10.

The controller 62 may be directly or indirectly connected through an I/O bus to any manner of peripheral devices such as storage devices, wireless adaptors, printers, and the like. In addition, a database (DB) may be communicatively connected to the controller 62 and provide a data repository for the storage and correlation of the perforation profiles 64 with particular values of the control variables 60.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A method for producing perforation lines between adjacent lottery tickets in an automated production line, wherein the lottery tickets are intended for folding at fold lines into a Z-fold pattern prior to packaging, the method comprising:
    conveying a substrate through a perforation station in the automated production line, the substrate having individual lottery ticket indicia printed thereon such that a continuous stream of adjacent lottery tickets oriented end-to-end are conveyed through the perforation station;
    controlling a perforation machine at the perforation station with a controller to define perforation lines between the adjacent lottery tickets, wherein the controlling process further comprises:
        determining fold perforation lines that correspond to the fold lines in the Z-fold pattern;
        for the fold perforation lines, the controller programming the perforation machine to produce a second perforation profile that is structurally different from a first perforation profile produced for non-fold perforation lines that lie between the fold lines in the Z-fold pattern;
        wherein the second perforation profile provides a stronger perforation line as compared to the first perforation profile to compensate for weakness induced in the fold perforation lines from being folded; and
        wherein the first and second perforation profiles are produced in a pattern on the substrate conveyed through the perforation station such that the second perforation profile is produced in the fold perforation lines.

2. The method according to claim 1, wherein the second perforation profile is produced such that, after the fold perforation lines are weakened by being folded, a relatively same tear force is needed to separate the lottery tickets at the fold perforation lines as compared to non-fold perforation lines.

3. The method according to claim 1, wherein there is at least one of the non-fold perforation lines between the fold lines in the Z-fold pattern.

4. The method according to claim 1, wherein there are at least two of the non-fold perforation lines between the fold lines in the Z-fold pattern.

5. The method according to claim 1, wherein different second perforation profiles are pre-generated and stored in an electronic library accessible by the controller, the different second perforation profiles corresponding to different types of substrate characteristics.

6. The method according to claim 5, wherein the perforation machine is a laser perforation machine having one or more laser perforation heads that are controlled by the controller for producing the different perforation profiles in the substrate conveyed through the perforation station.

7. A system for producing a perforation line between adjacent lottery tickets in an automated production line wherein a substrate is conveyed through a perforation station in the automated production line, the substrate having individual lottery ticket indicia printed thereon such that a continuous stream of adjacent lottery tickets oriented end-to-end are conveyed through the perforation station prior to being folded into a Z-fold pattern for subsequent packaging, the system comprising:
a perforation machine at the perforation station to produce perforation lines between the adjacent lottery tickets;
a controller in communication with the perforation machine, wherein the controller is configured to:
receive an input determining fold perforation lines that correspond to fold lines in the Z-fold pattern; for the fold perforation lines, the controller programming the perforation machine to produce a second perforation profile that is structurally different from a first perforation profile produced for non-fold perforation lines that lie between the fold lines in the Z-fold pattern; and
wherein the second perforation profile is a stronger perforation line as compared to the first perforation profile to compensate for weakness induced in the fold perforation lines from being folded.

8. The system according to claim 7, wherein the second perforation profile is produced such that, after the fold perforation lines are weakened by being folded, a relatively same tear force is needed to separate the lottery tickets at the fold perforation lines as compared to non-fold perforation lines.

9. The system according to claim 7, wherein different second perforation profiles are pre-generated and stored in an electronic library accessible by the controller, the different second perforation profiles corresponding to different types of substrate characteristics.

10. The system according to claim 9, wherein the perforation machine is a laser perforation machine having one or more laser perforation heads that are controlled by the controller for producing the different perforation profiles in the substrate conveyed through the perforation station.

* * * * *